United States Patent [19]
Roman

[11] 3,782,175
[45] Jan. 1, 1974

[54] APPARATUS FOR TESTING FILTERABLE SOLIDS CONTENT IN LIQUIDS

[76] Inventor: Michael H. Roman, 18 Eugene St., Lowville, N.Y. 13367

[22] Filed: June 5, 1972

[21] Appl. No.: 259,800

[52] U.S. Cl. .............................. 73/61 R, 210/406
[51] Int. Cl. ...................... B01d 37/00, G01n 33/04
[58] Field of Search ...................... 73/61 R; 210/406

[56] References Cited
UNITED STATES PATENTS

| | | | |
|---|---|---|---|
| 3,063,289 | 11/1962 | Moul | 73/61 R |
| 2,896,787 | 7/1959 | Roman | 210/406 |
| 2,874,843 | 2/1959 | Townsend | 210/406 X |

FOREIGN PATENTS OR APPLICATIONS

| | | | |
|---|---|---|---|
| 153,843 | 10/1953 | Australia | 210/406 |

Primary Examiner—Richard C. Queisser
Assistant Examiner—Joseph W. Roskos
Attorney—Charles S. McGuire

[57] ABSTRACT

Apparatus for testing the amount of filterable solids in a liquid sample by passing the sample from one receptacle to another through communicating openings in each with a filter element interposed therebetween. The two receptacles are constructed for releasable engagement, and a negative pressure applied to the interior of the second container serves the dual purposes of rapidly drawing the sample through the filter and urging a lip around the opening in the first container into tight engagement with the filter element.

9 Claims, 3 Drawing Figures

APPARATUS FOR TESTING FILTERABLE SOLIDS CONTENT IN LIQUIDS

BACKGROUND OF THE INVENTION

The present invention relates to apparatus for determining the content of filterable solids in a liquid sample and, more particularly, to apparatus employing vacuum to transfer a liquid sample from a first to a second container through communicating openings, with a filter material interposed therebetween.

In my U.S. Pat. No. 3,485,086 there is disclosed milk testing apparatus comprising two receptacles adapted to be arranged with a plurality of openings in each receptacle in communicating relation. The upper receptacle includes four separate compartments adapted to receive segregated milk samples for transfer to the lower receptacle through a filter interposed between the openings in the two receptacles. The upper receptacle includes a flat bottomed plug for insertion in an upstanding collar around the top of the lower receptacle.

While the apparatus of my aforementioned patent provided an effective means of testing milk for abnormality by vacuum assisted transfer between two receptacles with a filter interposed therebetween, it is often desirable to test the concentration of sediment or foreign matter in a single, measured sample of milk, or other liquids. A convenient method of effecting such testing is to cause the liquid sample to pass through a filter and gauge the degree of contamination by the degree of discoloration of the filter. In order to enhance accuracy of this type of measurement it is important that the entire sample be strained through a uniform, identifiable portion of the filter. This may be achieved by precise positioning and tight engagement of the upper and lower receptacles with the said portion of the filter element between the communicating openings of each.

A principal object of the present invention is to provide novel, inexpensive apparatus for efficiently and repeatably testing the concentration of filterable solids in a liquid sample.

Another object is to provide apparatus for determining the degree of contamination with solid foreign matter of a liquid sample by vacuum assisted transfer of the liquid from one receptacle to another through a filter element wherein the two receptacles are relatively proportioned and shaped to insure uniform, repeatable results while being extremely quick and easy to assemble and disassemble.

Other objects will in part be obvious and will in part appear hereinafter.

SUMMARY OF THE INVENTION

In accordance with the foregoing objectives, the invention comprises a pair of receptacles adapted for assembly with an opening through a wall of each receptacle in aligned communication. The first receptacle is for initially holding a test sample of a liquid to be transferred to the other receptacle through the communicating openings and an interposed filter element. The two receptacles include peripheral, slidably mating collars with the openings in the walls surrounded by the collars, whereby the latter serve to align the openings when the receptacles are assembled.

The wall of the first receptacle which includes the openings is outwardly convex, sloping from the inside of the aforementioned collar toward the opening in the center. A lip is provided around the opening extending outwardly from the convex wall. The opposing wall of the other receptacle is essentially flat and the central opening is in a recess for accepting the filter element. A plurality of smaller openings, also within the recess, surround the central opening through which the sample passes. A vacuum source or aspirator is placed in communication with the interior of the other receptacle, thereby assisting in drawing the liquid sample through the filter from one receptacle to the other. At the same time the negative pressure is applied through the small openings to the convex wall of the first receptacle, thus drawing the lip surrounding the opening therein tightly against the filter element. This insures that all of the liquid sample will pass through a well-defined area of the filter element, corresponding substantially exactly to the diameter of the communicating openings. The highly beneficial result is an exact and repeatable test wherein all filterable solids are concentrated in a known area of a filter element, and which is performed with simple and inexpensive apparatus.

DESCRIPTION OF THE PREFERRED EMBODIMENT

Figure 1:
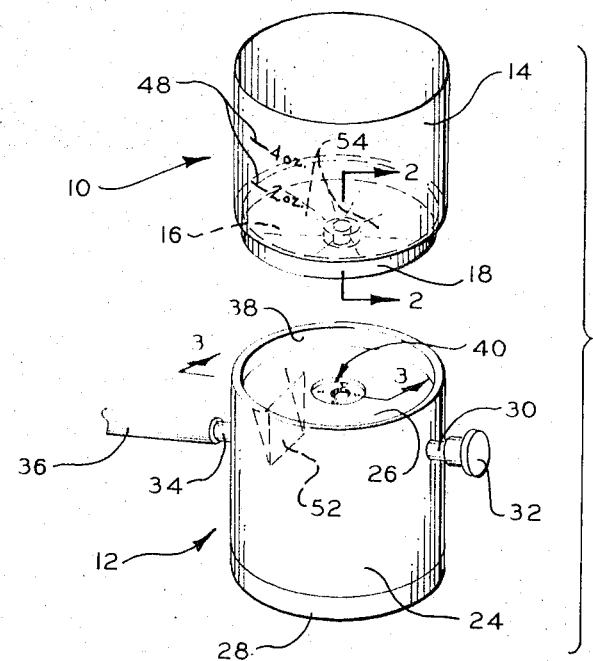
FIG. 1 is a perspective view of the preferred embodiment, shown with the two receptacles separated.
Figure 2:
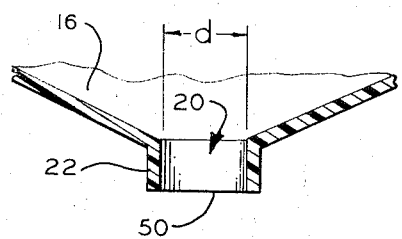
FIG. 2 is a fragmentary, sectional view of a portion of one of the receptacles, taken substantially on the line 2—2 of FIG. 1.

The apparatus of the invention comprises a pair of hollow, cylindrical receptacles which are separate, but adapted for assembly in superposed relation. When assembled, upper receptacle 10 rests upon and is directly above lower receptacle 12. Upper receptacle 10 includes cylindrical side wall 14, having an open top and convex bottom wall 16. Cylindrical collar 18 extends downwardly from side wall 14 at a slightly smaller diameter. Central opening 20, of predetermined diameter d (FIG. 2), is provided in bottom wall 16, and is surrounded by lip 22 extending outwardly from the bottom wall.

Lower receptacle 12 includes cylindrical side wall 24, of substantially identical diameter to side wall 14 of the upper receptacle, and upper wall 26. The bottom of the lower receptacle is open and covered with tightly fitting cap 28. Extending from openings in side wall 24 are pour spout 30, covered by cap 32, and short tube 34 providing a connection for flexible line 36. An aspirator or vacuum motor (not shown) is connected to line 36 to apply a negative pressure to the interior of lower receptacle 12.

Upper wall 26 is flat and is recessed below the upper rim of side wall 24, thus forming upstanding collar 38. Circular recess 40 is formed in a central portion of upper wall 26. The upper surface of the recess is likewise flat, lying in a plane parallel to and between the planes of the upper and lower surfaces of upper wall 26. Within recess 40 are centrally disposed opening 42, of diameter and corresponding to opening 20, and a plurality (four, in the illustrated embodiment) of openings 44 of a diameter substantially smaller than that of openings 20 and 42.

Figure 3:
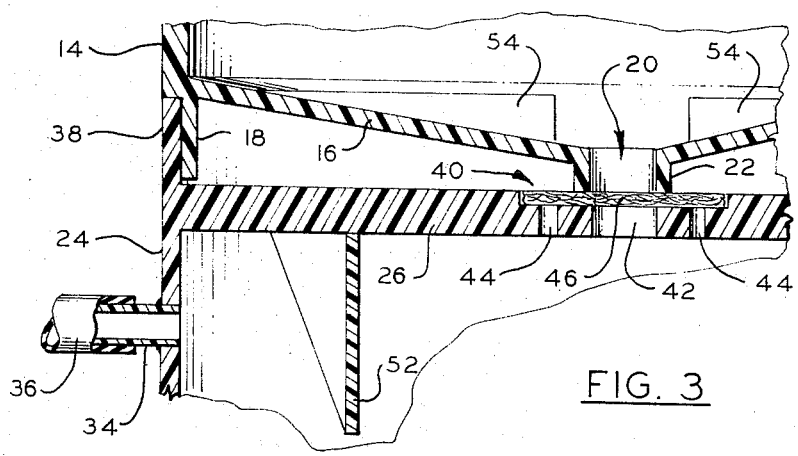
FIG. 3 is a fragmentary, sectional view of the other receptacle, taken substantially on the line 3—3 of FIG. 1, with a fragment of the first receptacle shown in assembled position thereon.

When a sample is to be tested, a conventional, disc-shaped filter element, such as that shown in FIG. 3 and designated by reference numeral 46, is placed in recess 40. The filter material and density may be chosen from a variety of suitable examples in accordance with the nature of the sample and desired filtering efficiency. Next, upper receptacle 10 is placed on lower receptacle 12 in the manner indicated, with collar 18 sliding into collar 38. Dimensions of the inside diameter of collar 18 are preferably quite close so that, although a freely sliding fit is provided, the upper and lower receptacles are rather precisely laterally aligned to insure alignment of openings 20 and 42, and dimensioned to insure efficiency of the vacuum connection.

After assembly of the two receptacles with the filter therebetween, the liquid sample is placed in the upper receptacle. In order to facilitate measurement of the sample, fiducial markings such as those indicated at 48, may be provided. The vacuum is then applied through line 36 to substantially lower the pressure within lower container 12 below atmospheric. This will cause rapid passage of the sample, exposed to atmospheric pressure on its upper surface through filter 44 and communicating openings 20 and 42. Also, the interior of the lower container communicates through openings 44 with the space between walls 16 and 26 of the two receptacles, as shown in FIG. 3. The reduced pressure on the lower surface of wall 16 serves to draw edge 50 (FIG. 2) of lip 22 tightly into engagement with filter element 46. This insures that each sample will pass through exactly the same area of filter material each time a test is performed. The area through which the sample is strained will be well-defined and easily identifiable. Accuracy of direct comparison of filter elements from different tests is also enhanced.

Baffle 52 is provided on the inside of upper wall 26 between opening 42 and tube 34 to prevent the liquid sample from being drawn directly into the vacuum line. Baffles 54 may be provided in like manner within receptacle 10 extending radially from central opening 20 in order to reduce any "whirlpool" effect as the sample is rapidly drawn out of the upper receptacle, resulting in more uniform distribution of solids over the utilized area of the filter. After one or more samples have been tested in the course of transfer to the lower receptacle, the latter may be emptied by removing cap 32 and pouring the contents out of the receptacle through pour spout 30. This provides, of course, for saving or re-using any samples which may be of value.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Apparatus for testing the amount of filterable solids in a liquid sample, said apparatus comprising, in combination:
   a. a first receptacle having side and bottom walls and an open top for receiving a liquid test sample;
   b. a second receptacle having top, bottom and side walls defining a closed interior connected to means for applying a subatmospheric pressure thereto;
   c. mutual engagement means on said first and second receptacles for releasably assembling the two in predetermined relation with said first receptacle bottom wall and said second receptacle top wall in spaced, opposing relation with an essentially airtight space defined therebetween;
   d. each of said receptacles having an opening in opposing walls, the two openings being of substantially the same diameter and in alignment to place the two receptacles in communication when said receptacles are in said predetermined relation;
   e. said first receptacle having a lip surrounding the opening therein extending toward said top wall of said second receptacle when said receptacles are in said predetermined relation, whereby said airtight space is annular about said lip; and
   f. at least one additional opening in said top wall of said second receptacle through which the interior of said second container communicates with said annular space, whereby the subatmospheric pressure is applied through said additional opening to said annular space to urge said receptacles toward mutual engagement.

2. The invention according to claim 1 wherein said bottom wall of said first receptacle is convex, extending from the periphery of said first receptacle toward said top wall of said second receptacle at the center.

3. The invention according to claim 2 wherein said communicating openings are substantially at the center of said opposing walls.

4. The invention according to claim 5 wherein said top wall of said second receptacle is essentially flat.

5. The invention according to claim 4 wherein said opening and additional opening in said top wall of said second receptacle are in a recessed portion thereof having a surface in a plane parallel to and between the upper and lower surfaces of said second receptacle top wall.

6. The invention according to claim 1 wherein said mutual engagement means comprise telescoping collars extending from each of said receptacles.

7. The invention according to claim 6 wherein said receptacles are substantially cylindrical and said collars extend around the periphery of one end of each.

8. The invention according to claim 7 and further including baffle means within said second receptacle arranged between said communicating opening therein and the connection of the subatmospheric pressure applying means.

9. The invention according to claim 7 and further including at least one baffle within said first receptacle extending from the upper surface of said bottom wall radially with respect to said opening to reduce rotary motion of the liquid sample passing through said opening.

* * * * *